United States Patent Office 2,912,382
Patented Nov. 10, 1959

2,912,382

ELECTRICAL INSULATING STRUCTURE AND METHOD OF MAKING THE SAME

Tseng W. Liao and Frank S. Nichols, Pittsfield, Mass., assignors to General Electric Company, a corporation of New York No Drawing. Application September 5, 1957
Serial No. 682,077

11 Claims. (Cl. 252—63.2)

The present invention relates to electrical insulating structures, and more particularly to an insulating base material incorporating a composite dielectric impregnant for improving the electrical properties of the base material.

Insulation products with which the present invention is concerned include those in the form of wound cylinders, laminated plates, and other structures useful as dielectric barriers in transformers and other electrical apparatus to insulate parts having different electrical potential from each other.

The base materials used for such insulation products are generally porous, and dielectric impregnants of various types and compositions have previously been used to fill the voids in the base material. In liquid-filled apparatus, such as oil-type transformers, the dielectric liquid is relied on the permeate the porous insulation material and to thus provide a composite solid-liquid insulation structure. Liquid dielectrics, however, have certain drawbacks such as risk of leakage, deterioration by oxidation or other chemical change, and variation in dielectric strength; and to avoid these disadvantages it has been the practice in many cases to use resinous types of dielectric impregnant, such as synthetic resins which are applied to the base insulation in liquid form and cured to solid state. Such solid insulation has the further advantage of rigidity and mechanical strength which contribute to greater mechanical stability of the assembled electrical apparatus.

Although it is customary to apply the liquid resin to the base material under vacuum conditions to provide thorough impregnation of the base material by the resin, experience has shown that the formation of spaces or voids in the cured material is practically unavoidable regardless of the resin or process used. Such voids may result, for example, from shrinkage of the resin or formation of bubbles therein during the curing process. As a consequence, the electrical strength of the composite insulation is less than would be expected from the dielectric materials themselves, and in particular the corona starting voltage is not sufficiently high. The formation of corona in insulating structures, as well known to those skilled in the art, is to be avoided so far as possible since corona effects over a prolonged period eventually causes deterioration of the insulating structure and leads to premature breakdown of the electrical apparatus.

It is an object of the invention to provide insulating structures which avoid the above disadvantages of prior types of insulating material, and to provide a method of making the improved insulating structures.

It is another object of the invention to provide solid insulation material especially of synthetic resin composition having improved electrical properties, and particularly having improved resistance to the formation of electrical discharges or corona therein when subjected to high operating voltages.

In accordance with the invention, the improved insulating structure is obtained by initially subjecting the porous base material, such as kraft paper or pressboard, to a vacuum, thereafter exposing the base material to an atmosphere of a high dielectric strength gas such as $SF_6$ or other fluorogas, and treating the thus impregnated base material with a hardenable synthetic resin dielectric liquid.

By virtue of the vacuum impregnation of the porous base material with a high dielectric strength gas, the air in the interstices of the base material is effectively displaced by the gas, and even though the liquid resin impregnant thereafter introduced into the insulating material may upon hardening have voids or cracks therein, such spaces are filled with the high dielectric strength gaseous material permeating the base material. The resultant composite insulating structure thus has all the advantages of solid insulation, such as stable electrical properties, rigidity, and freedom from leakage, while at the same time overcoming the difficulties resulting from the shrinking or cracking which generally characterize solid insulation materials, especially of the synthetic resin type.

The base insulation material can be of a variety of compositions, such as kraft paper, pressboard, cotton cloth, glass cloth, asbestos sheet, mica mat or any other porous or fibrous impregnatable material suitable for use as electrical insulation. The base material may be in any desired form such as sheets, tubes, convolutely wound cylinders, flat laminates, or other configuration for use as barriers between transformer windings, as coil layer insulation, coil end shields, turn insulation or other structures employed in electrical apparatus, especially in regions where high electrical stress will be encountered. In the multi-ply forms, the layers may be bonded together by any suitable means known in the art.

The hardenable liquid impregnant used in practicing the invention is preferably a completely reactive liquid polymerizable composition. These compositions may include any liquid polymerizable material which upon being heated, ordinarily with a catalyst or polymerizing agent, polymerizes into a thermosetting, relatively hard resinous solid body. An example of such resins are the so-called solventless varnishes, including polyester resins which are formed from a mixture of an unsaturated alkyd resin and a vinyl monomer. Examples of compositions of such solventless varnishes are set forth, for instance, in United States Patent 2,645,626. Such resins are advantageous in that they may be caused to polymerize to form substantially infusible and insoluble materials without the necessity of taking up oxygen from the air and without forming volatile products. A particular composition of such resins found especially suitable for practicing the present invention is a mixture of diethylene glycol maleate and diallyl phthalate.

In these compositions, the unsaturated alkyd resins are the reaction products of polyhydric alcohols, mixtures of polyhydric alcohols or mixtures of polyhydric and monohydric alcohols, and an ethylenically unsaturated polycarboxylic acid or plurality of polycarboxylic acids, at least one of which is an unsaturated polycarboxylic acid. Examples of such polyhydric alcohols are ethylene glycol, di- and tri-ethylene glycols, propylene glycol, trimethylene glycol, tetramethylene glycol, pentamethylene glycol, and glycerine or pentaerythritol in combination with a monohydric alcohol. Examples of unsaturated polycarboxylic acids which may be employed are maleic, fumaric, and itaconic acids. Anhydrides of polycarboxylic acids may also be employed and it is intended to include in the meaning of "polycarboxylic acid" as used herein the anhydrides of such acids. In addition to one or more of the unsaturated polycarboxylic acids, saturated polycarboxylic acids may also be present in the reaction mixture in the preparation of the above resins. Examples of such polycarboxylic acids are succinic, adipic, sebacic, and phthalic acids.

The vinyl monomers which are used in forming copolymers with the above unsaturated alkyd resins include such polymerizable substances as esters of unsaturated monohydric alcohols and polycarboxylic acids, including unsaturated polycarboxylic acids, halogenated aromatic polycarboxylic acids and inorganic acids. Examples of such substances are diallyl phthalate, diallyl succinate, diallyl maleate, diallyl fumarate, diallyl itaconate, diallyl chlorphthalate, and triallyl phosphate. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate and dibenzyl fumarate, and other substances containing polymerizable ethylenic groups such as styrene.

While the above polyester resins may be cured to an infusible state by means of heat alone, e.g., at temperatures at 80–150° C., a small amount of catalyst is preferably added to the polyester resin mixture to facilitate polymerization. Among the substances which may be used as catalysts for this purpose are inorganic super oxides such as barium peroxide and sodium peroxides; aliphatic peroxides, such as acetyl peroxides; aromatic acid peroxides such as benzoyl peroxide; and other mixed organic peroxides such as acetyl benzoyl peroxide and ketone peroxides such as acetone peroxide and triacetone peroxide.

A further group of organic resins suitable for use in the present invention for impregnating the base insulating material are the epoxy resins, which are condensation products of polyhydroxy compounds, such as polyhydric phenols and polyhydric alcohols and epichlorohydrin.

Examples of polyhydroxy compounds which may be used are glycerol, diphenylol propane, and the mixed poly (hydroxyl phenyl) pentadecanes derived from cashew nuts. An example of an epoxy resin which may be used in accordance with the invention is the condensation product of epichlorohydrin and 2,2' bis phenylol propane. Such epoxy resins may be cured by any of the known cross-linking agents therefor such as amines, amine-producing compounds, dibasic acid anhydrides, and other curing agents known in the art.

The gaseous component of the composite insulating structure of the present invention can be any of a number of known or suitable dielectric gases having high dielectric strength, as, for example, electronegative fluorogases. Sulfur hexafluoride $SF_6$ has proved particularly suitable, but other gases such as octafluoropropane $C_3F_8$, decafluorobutane $C_4F_{10}$, hexafluorobutyne-2 $C_4F_6$, and the cyclic compound c-$C_4F_8$, as well as many others could be employed. The gases used should, of course, have a dielectric strength substantially greater than that of air, and preferably should be inert or non-reactive with respect to the resin impregnant used in combination therewith.

A comparative test was made to determine the relative corona starting voltages of two groups of samples of turn insulation composed of manila paper wherein the samples of one group were impregnated using conventional vacuum techniques with a resin composed of one part of diethylene glycol maleate and three parts of diallyl phthalate, and the samples of the other group were impregnated with the same resin after the base material had been pretreated with $SF_6$ in accordance with the invention. The average corona starting voltage of the conventionally impregnated insulation was found to be about 10,000 volts, whereas the average corona starting voltage of the $SF_6$ treated material was about 17,000 volts. The improvement over the usual impregnating process which is afforded by the present invention is thus shown to be about 70% in increased voltage which may be applied before corona effects are observed.

A typical process which may be employed in carrying out the present invention is the following, it being understood that the method described is merely illustrative and not intended to limit the invention in any way. A preformed insulating structure composed of a porous base material such as kraft paper is placed in an impregnating vessel, and the vessel is evacuated to a pressure of about one millimeter of mercury or less to remove air and other volatile material from the base material. Then a high dielectric strength gas such as $SF_6$ at atmospheric pressure or higher is introduced into the evacuated vessel. The vessel is thereafter evacuated again to about one millimeter of mercury or less, thus leaving the $SF_6$ gas in the chamber at low pressure. A liquid resin impregnant of the above types is then introduced into the vessel, returning the vessel to atmospheric pressure, so that the base structure is completely immersed therein. After allowing sufficient immersion time for the base material to become thoroughly permeated by the liquid resin, the resin is drained from the vessel, and the impregnated material is baked at about 125° C. for several hours to cure the resin. The actual temperature and time of baking may vary widely, depending on the particular resin and catalyst used.

As a result of the above-described treatment, any voids or gaps formed in the hardened resin impregnant or elsewhere in the base structure during the process of curing are filled with the $SF_6$ gas instead of air as in the prior methods of making solid insulation structures of this type. The composite insulation thus formed has considerably improved resistance to electrical stresses and corona formation.

The expression "porous base material" as used in the specification and claims is intended to broadly refer to any type of porous material which it is desired to impregnate with the composite solid-gas dielectric material of the present invention. Thus, while the base material per se may not necessarily be impregnatable, such as the glass strands of a woven glass cloth, the woven cloth itself is porous and thus susceptible of impregnation with liquid and gaseous materials as described herein. Furthermore, the invention is not limited to a base material of homogeneous composition nor one solely of an insulating nature. For example, a wound coil of insulation-coated wire may be treated in accordance with the invention to provide a composite solid-gas insulation impregnant between the turns of the insulated wire coil to fill the gaps therein with an effective insulating material. Other composite base structures also come within the scope of the present invention, as, for example, a combined metal-insulation structure wherein the composite solid-gas insulating material of the present invention may be applied to fill any spaces between the metal portion and the insulation material, such as may otherwise occur, for example, by the shrinkage of the cured resin impregnant away from the metal surface.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. The method of making an electrical insulating structure which comprises impregnating porous base material with a gaseous dielectric material having a dielectric strength substantially greater than air, and thereafter impregnating the thus treated base material with a hardenable liquid insulation material.

2. The method of making an electrical insulating structure which comprises impregnating porous base insulation material with a gaseous dielectric material having a dielectric strength substantially greater than air, impregnating the thus treated porous base material with a hardenable liquid insulation material, and hardening the liquid insulation material in the base insulation material.

3. A method of making an electrical insulating structure which comprises impregnating porous base insulation material with a gaseous dielectric material comprising an electronegative gas, impregnating the thus treated base insulation material with a completely polymerizable liquid synthetic resin material, and thereafter polymerizing the liquid synthetic resin material in the base insulation material.

4. The method defined in claim 3, wherein said synthetic resin is a polyester resin.

5. The method defined in claim 3, wherein said synthetic resin is an epoxy resin.

6. A method of making an electrical insulating structure which comprises impregnating under a vacuum porous insulating base material with a gaseous dielectric material having a dielectric strength substantially greater than air, impregnating under a vacuum the thus treated porous insulating base material with a hardenable liquid synthetic resin dielectric material, and thereafter hardening the liquid resin dielectric material in the insulating base material.

7. An electrical insulating structure having high resistance to electrical stresses comprising a porous base material impregnated with a composite dielectric composed of a solid dielectric material incorporating a gaseous dielectric material having a dielectric strength substantially greater than air.

8. An electrical insulating structure having high resistance to electrical stresses comprising a porous base insulating material impregnated with a polymerizable synthetic resin dielectric material having the voids therein filled with a gaseous dielectric material having a dielectric strength substantially greater than air.

9. The structure defined in claim 8, wherein the synthetic resin is a completely polymerizable polyester resin.

10. The structure defined in claim 8, wherein the synthetic resin is an epoxy resin.

11. The structure defined in claim 8, wherein the gaseous dielectric material is an electronegative fluorogas.

References Cited in the file of this patent

UNITED STATES PATENTS

| | | |
|---|---|---|
| 1,547,539 | Antropoff | July 28, 1925 |
| 1,717,243 | Nauk | June 11, 1929 |
| 1,729,057 | Texier | Sept. 24, 1929 |
| 1,869,308 | Emanueli | July 26, 1932 |
| 2,797,373 | Peck | June 25, 1957 |
| 2,858,492 | Lamphier | Oct. 28, 1958 |
| 2,867,679 | Cobine | Jan. 6, 1959 |